United States Patent [19]

Gemmen et al.

[11] Patent Number: 5,791,889

[45] Date of Patent: Aug. 11, 1998

[54] COMBUSTOR OSCILLATING PRESSURE STABILIZATION AND METHOD

[75] Inventors: Randall S. Gemmen; George A. Richards; Mui-Tong Joseph Yip, all of Morgantown; Edward H. Robey, Westover; Scott R. Cully, Morgantown, all of W. Va.; Richard E. Addis, Smithfield, Pa.

[73] Assignee: The United States of America as represented by the United States Department of Energy, Washington, D.C.

[21] Appl. No.: 644,609

[22] Filed: Apr. 26, 1996

Related U.S. Application Data

[60] Provisional application No. 60/005,459 Oct. 13, 1995.

[51] Int. Cl.$^6$ .................................................. F23C 11/04
[52] U.S. Cl. ............................. 431/1; 431/160; 431/347; 60/39.76
[58] Field of Search ................... 431/1, 160, 347, 431/114; 122/24; 60/39.76, 39.77, 39.8

[56] References Cited

U.S. PATENT DOCUMENTS

| | | | |
|---|---|---|---|
| 5,123,835 | 6/1992 | Richards et al. | 3/1 |
| 5,361,710 | 11/1994 | Gutmark et al. | 431/1 |
| 5,372,008 | 12/1994 | Sood | 60/737 |
| 5,397,232 | 3/1995 | Nishimura | 431/1 |
| 5,428,951 | 7/1995 | Wilson et al. | 431/1 |

OTHER PUBLICATIONS

"Practical Active Control System for Combustion Oscillations" P.J. Langhorne et al, Jet Propulsion, vol. 6, No. 3 (1990) pp. 324–333.

"Peroidic Chemical Energy Release for Active Conrtrol", K.C. Schadow et al, ISABE–International Symposium on Air Breathing Engines, 11th, Tokyo, JA (1993), vol. 1, pp. 479–485.

"Recent Progress in the Implementation of Active Combustion Control", K.C. Schadow et al, ICAS Congress, 18th, Bejing, China (1992), vol. 1, Paper No. ICAS 92–2.5.3, pp. 942–952.

"Active Control of Combustors with Several Frequency Modes", S. Sivasegaram et al, ASME Winter Annual Meeting, Anaheim, CA, (1992), Dynamic System and Control Div, vol. 38 pp. 69–74.

"A Review of Active Control of Combustion Instabilities", K.R. McManus et al, Prog. Energy Combust. Sci., vol. 19 pp. 1–29.

"Combustion Instabilities Coupled by Pressure Waves and their Active Control", S.M. Candel, The Twenty–Fourth (International) Symposium on Combustion (1992) pp. 1277–1296.

"Active Control for Gas Turbine Combustors", J. Brouwer et al The Twenty–Third (International) Symposium on Combustion, (1990) pp. 1087–1092.

"Active Control of Reheat Buzz", G.J. Bloxsidge et al, AIAA Journal, (1988), pp. 783–790.

"Active Control of Unsteady Combustion–Induced Oscillations", AIAA Journal of Propolusion and Power, (1992), vol. 8, No. 5, pp. 1109–1115.

"Closed–Loop Amplitude Modulation Control of Reacting Premixed Turbulent Jet", E. Gutmark et al, AIAA Journal, (1991), vol. 29, No. 12, pp. 2155–2162.

"Combustion Oscillation Control by Cyllic Fuel Injection", ASME Turbo Expo Meeting, Houston, TX, (Jun. 5–6, 1995), 7 pages.

*Primary Examiner*—James C. Yeung
*Attorney, Agent, or Firm*—Lisa A. Jarr; Stephen D. Hamel; William R. Moser

[57] ABSTRACT

High dynamic pressure oscillations in hydrocarbon-fueled combustors typically occur when the transport time of the fuel to the flame front is at some fraction of the acoustic period. These oscillations are reduced to acceptably lower levels by restructuring or repositioning the flame front in the combustor to increase the transport time. A pilot flame front located upstream of the oscillating flame and pulsed at a selected frequency and duration effectively restructures and repositions the oscillating flame in the combustor to alter the oscillation-causing transport time.

22 Claims, 4 Drawing Sheets

COMBUSTOR OSCILLATING PRESSURE STABILIZATION AND METHOD

CROSS-REFERENCE TO RELATED APPLICATION

This application claims the benefit of U.S. Provisional Patent Application Ser. No. 60/005,459 filed on Oct. 13, 1995.

BACKGROUND OF THE INVENTION

The present invention relates generally to the control of combustion oscillations in combustion systems, and more particularly to the apparatus and method for reducing undesirably high dynamic pressure oscillations in a combustion chamber to acceptably lower levels by using a pulsating pilot flame for selectively positioning or restructuring the oscillating flame front in the combustion chamber. The United States Government has rights in this invention pursuant to the employer-employee relationship of the U.S. Department of Energy and the inventors.

Combustion systems such as used in conjunction with gas turbines and steam-generators commonly utilize a hydrocarbon fuel with air in substantially stoichiometric ratios in an associated combustion chamber for the generation of sufficient heat energy for driving the turbine or for the generation of steam. Some environmental pollution has been caused by the exhaust emissions resulting from the burning of hydrocarbon fuels in such applications. Efforts to reduce these environmental polluting emissions include pre-mixing the fuel and air prior to introducing the mixture into the combustion chamber.

Also, the use of such pre-mixes in a so-called lean pre-mix, i.e., a mixture where the volume of fuel is present at less than stoichiometric ratio with the air, provides for a reduction in nitrous oxide emissions. A typical combustion system using a lean pre-mix is described in U.S. Pat. No. 5,372,008, which issued Dec. 13, 1994, and which is incorporated herein by reference.

While the use of pre-mixes (lean and near or essentially stoichiometric) of a hydrocarbon fuel and air has been successful in reducing the emissions of environmental pollutants so as to alleviate the impact of these emissions on the environment, it has been found that combustion instability in the form of dynamic pressure oscillations occurs in combustion systems using such pre-mixes, especially lean pre-mixes. As indicated by Rayleigh's criteria, "Theory of Sound", Volume II, No. 8, Dover, N.Y., 1995, the amplitude the oscillations in the combustion chamber will be the strongest when the pressure wave is in-phase with the periodic heat release produced by the combustion of the fuel-air mixture. These dynamic pressure oscillations are frequently of a sufficiently high magnitude so as to produce undesirable operating conditions including the reduction of the useful life of the combustion system components due to structural fatigue, vibrations, and cycling fatigue.

Efforts to remove or reduce unacceptably high-dynamic pressure oscillations in hydrocarbon-fueled combustion systems have been somewhat successful. For example, as described in the publication, "Practical Active Control System for Combustion Oscillations", P. J. Langhorne, J. Propulsion, Volume 6 No. 3, pp 324–333, May–June 1990, the low frequency combustion instability in a flame present in a duct defining a combustion chamber was successfully controlled by the unsteady addition of extra fuel. As reported in this publication, in an application where the main fuel was introduced into the duct as a lean pre-mix with a stoichiometric ratio of fuel to air in the range of about 0.63 to 0.70, the addition of only 3% more fuel reduced by 12 decibels (dB) the 164 dB peak in the pressure spectrum in the duct due to the combustion instability. As further reported in this publication, the unsteady or phased introduction of the excess fuel into the duct was a pre-mix with air and was injected sufficiently close to the main flame to create local rich spots which destabilize the flame and thereby reduce the oscillations. A feedback control loop using unsteady signals from the combustion chamber, such as light emissions produced from combustion generated radicals near the combustion region, was used for controlling the introduction of the secondary fuel.

Another previously known technique for reducing pressure oscillations in combustion chambers using lean pre-mixes of fuel and air is described in the paper entitled, "Combustion Oscillation Control by Cyclic Fuel Injection", G. A. Richards, M. J. Yip, E. Robey, L. Caldwell, and D. Rolands, presented at the 1995 ASME Turbo Expo Meeting, Houston Tex., Jun. 6, 1995. In this paper, the control over pressure oscillations in the combustion chamber was achieved by the cyclic injection of small quantities of extra fuel for counteracting the periodic heat release associated with the high-pressure oscillations. The added fuel produces secondary thermal energy which decouples the interaction between the thermal and acoustic energies leading to a reduction in the dynamic pressure amplitude.

A further previously known technique for reducing the pressure oscillations in hydrocarbon-fueled combustion chambers is reported in the publication, "Periodic Chemical Energy Release for Active Combustion Control", K. C. Schadow et al, ISABE-International Symposium on Air Breathing Engines, 11, Volume I, pp 479–485, Tokyo, Japan, September, 1993. In this Schadow et al publication a spark-initiated pulsed combustion actuator mounted in a tube located upstream of a combustion chamber generates periodic pulses of pilot flame which suppress pressure oscillations in the combustion chamber. In the combustion actuator a stoichiometric mixture of fuel and air was spark ignited at a frequency in the range of 50 Hz to over 1 kHz. A frequency generator in an open loop or a closed feedback using pressure fluxuations from the combustion chamber is utilized for controlling the frequency of the spark ignition.

SUMMARY OF THE INVENTION

While the previously known active control techniques for reducing or suppressing undesirable pressure oscillations in hydrocarbon-fueled combustion systems such as typified by those described in the aforementioned articles have been somewhat successful, the primary objective or aim of the present invention is directed to an even more effective active control apparatus and method for effecting the control or stabilization of unsteady combustion oscillating pressures in hydrocarbon-fueled combustors. Briefly, when unsteady pressure oscillations occur in a combustion chamber such as due to the transport time of the fuel to the flame front being at some fraction of the acoustic period, the amplitude of the oscillations in the combustion chamber will be the strongest when the pressure wave is in-phase with the periodic heat release produced by the combustion of the fuel-air mixture. In accordance with the objective of the present invention, the active control of unsteady combustion induced oscillations in a combustion chamber fired by a suitable fuel and oxidizer mixture, such as a hydrocarbon fuel and air mixture, is provided by restructuring and moving the position of the main flame front and thereby increasing the transport time and displacing the pressure wave further away from the in-phase relationship with the periodic heat release. The restructuring and repositioning of the main flame are achieved by utilizing a pilot flame which is pulsed at a predetermined frequency corresponding to less than about one-half the frequency of the combustion oscillation frequency with the duration of each pulse being sufficient to produce adequate secondary thermal energy to restructure the main flame and thereby decouple the heat release from the acoustic coupling so as to lead to a reduction in the dynamic pressure amplitude. The pulsating pilot flame produces a relatively small and intermittently existing flame front in the combustion zone that is separate from the oscillating main flame front but which provides the thermal energy necessary to effectively reposition the location of the oscillating main flame front out of the region in the combustion zone where the acoustic coupling can occur with the main flame and thereby effectively altering the oscillation-causing phase relationship with the heat of combustion.

Generally, the apparatus of the present invention is used for effecting the active control over unstable combustion in a combustion system conventionally comprising a combustion chamber having a combustion zone with opposite end regions and means for introducing a mixture of fuel and a suitable oxidizer into the combustion zone at one end region thereof. Unstable combustion of this fuel and oxidizer mixture forms an oscillating flame front within the combustion zone at a location intermediate the end regions thereof with pressure and amplitude of the resulting dynamic pressure oscillations being dependent upon the degree of in-phase relationship of the pressure wave produced by each oscillation with the heat produced by the combustion of the fuel in the fuel and oxidizer mixture. The apparatus of the present invention effectively reduces the pressure and amplitude of these pressure oscillations within the combustion chamber and comprises: a suitable fuel and oxidizer mixing volume or chamber means communicating with the combustion chamber at the aforementioned one end region thereof; oxidizer supplying means and fuel supplying means coupled to the chamber means for introducing thereinto at least one stream of fuel and oxidizer for forming a combustible mixture thereof in order to produce a pilot flame in the combustion zone at or near the one end region thereof; and, flow control means for intermittently interrupting or initiating the flow of the fuel from the fuel supplying means and/or the oxidizer from the oxidizer supplying means into the chamber means, or the combustible mixture from the mixing volume or chamber means into the combustion chamber, at a selected frequency and a selected duration for sequentially interrupting or initiating, i.e., establishing, the pilot flame and thereby sufficiently pulsing the pilot flame in said combustion zone to provide a source of secondary thermal energy contactable with the oscillating flame in the combustion zone for restructuring the oscillating flame for changing or moving the phase relationship of the pressure waves with the heat of combustion away from an in-phase relationship to effectively reduce the amplitude of the pressure oscillations. The selected frequency and duration of the energy pulses provided by the pulsating pilot flame are effective to sufficiently reposition the oscillating flame front in the combustion zone and thereby change the phase relationship of the pressure waves with the heat of combustion away from an in-phase relationship for reducing the amplitude of the pressure oscillations.

As a general rule, when the pressure oscillations in t combustion chamber are at a frequency in the range of about 20 to 5000 Hz, the intermittent interruption or initiation of the flow of at least one of the fuel and the oxidizer into the pilot chamber, or a mixture thereof into the pilot chamber or the combustion chamber, is provided at a frequency less than about one-half of that of the main-flame combustion oscillations. Also, establishing the flow of each pilot fuel and oxidizer mixture for a duration in the range of about 0.1 to 0.5 of the control frequency period, preferably about 1-20 milliseconds (ms), between each interruption of the flow provides for the desired restructuring of the oscillating flame when the fuel to oxidizer equivalence ratio is in the range of about 0.5 to about 1.0, as will be described in greater detail below.

The method of the present invention for reducing the amplitude of the oscillations within the combustion chamber is achieved by the steps comprising: forming a second mixture of fuel and oxidizer, introducing the second mixture into the combustion zone at a location adjacent to the one end region thereof at least for forming a pilot flame in the combustion zone at the aforementioned one end region thereof; and, intermittently interrupting or initiating the flow of the fuel and/or the oxidizer forming the second mixture, or the second mixture after the formation thereof, to produce discrete charges of the second mixture for intermittently producing and interrupting the pilot flame at a rate and for a duration adequate to sufficiently restructure and reposition the oscillating flame in the combustion zone from the first location to a second location for changing the phase relationship of the pressure waves to the heat of combustion with respect to in-phase relationship to substantially reduce the amplitude of the pressure oscillations in the combustion chamber. The rate of intermittently interrupting or initiating the flow of at least one of the oxidizer and the fuel defining the discrete charges of pilot flame mixture and the duration of each flow correspond to the control frequency and the duration described above.

Other and further objects of the present invention will become obvious upon an understanding of the illustrative embodiments and method about to be described or will be indicated in the appended claims, and various advantages not referred to herein will occur to one skilled in the art upon employment of the invention in practice.

Figure 1:
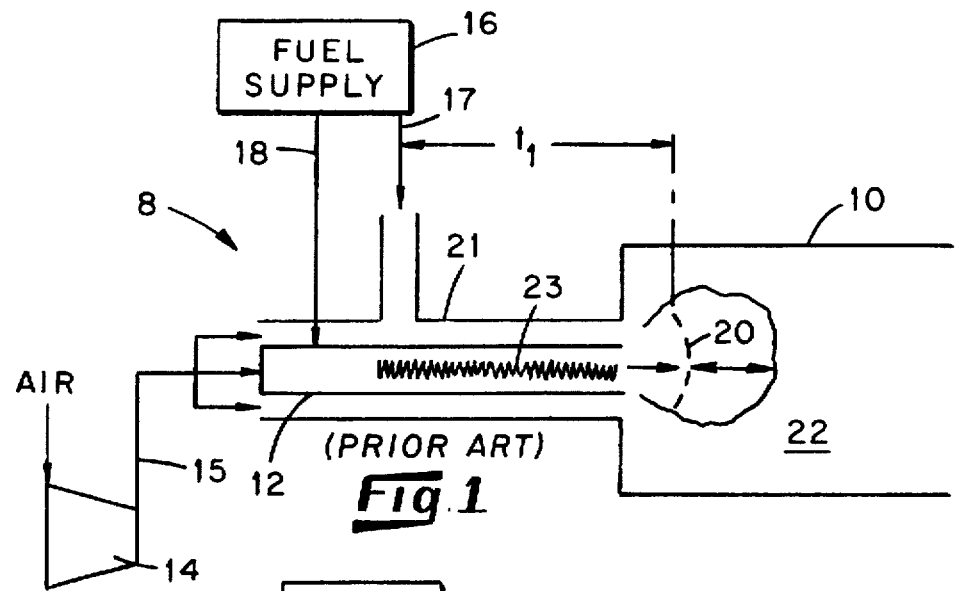
FIG. 1 is a schematic diagram of a combustion system illustrating unsteady combustion-induced oscillations of the main flame front in the combustion chamber as indicated by the double-ended arrows.

Preferred embodiments of the invention have been chosen for the purpose of illustration and description. The preferred embodiments illustrated are not intended to be exhaustive nor to limit the invention to the precise forms shown. The preferred embodiments are chosen and described in order to best explain the principles of the invention and their application and practical use to thereby enable others skilled in the art to best utilize the invention in various embodiments and modifications as are best adapted to the particular use contemplated. Also, while the combustion chambers illustrated in these drawings are somewhat limited in detail, it will appear clear that the particular construction and operational details of the combustion chamber are not critical since the present invention can be utilized in any combustion chamber of essentially any configuration in which the high-pressure oscillations are produced during the combustion process and wherein a pulsating pilot flame as provided by the present invention can be utilized for the restructuring the position of the main flame front. Further, while the combustion chambers as shown in the drawings are each provided with a pilot chamber located coaxially with the main axis of the combustion chamber, it will appear clear that the pilot chamber can be repositioned at other locations on the combustion chamber so as to introduce a pulsating pilot flame at a location different from that of the oscillating flame front so as to effectively restructure the primary or oscillating flame front and thereby reduce the amplitude of the oscillations in accordance with the teachings of the present invention.

The phrases "pilot chamber" and "chamber means" as used herein are intended to be descriptive of any walled structure containing a cavity or volume communicating with the fuel and oxidizer supplies and the interior of the combustion chamber and which is of a sufficient capacity to effect adequate mixing of the discrete charges of the pilot fuel and oxidizer. The particular shape and/or position of the pilot chamber or chamber means is not critical to the operation of the present invention as long as it provides for the mixing of the pilot fuel-oxidizer charges and the introduction of these charges into combustion chamber at the appropriate location therein for producing therein the pulsed pilot flame for the restructuring of the main flame. Also, the term "pilot" as used herein denotes a supply rate of fuel and oxidizer mixture that corresponds to about 2 to about 20 percent of the supply rate of the fuel and oxidizer mixture used for the main flame. Further, while the description below is primarily directed to the embodiments where the flow of the fuel or the oxidizer is selectively interrupted for establishing the pulsed pilot flame in the combustion chamber, it will appear clear that the flows of both the fuel and the oxidizer can be simultaneously controlled at selected frequencies and durations to produce the discrete charges of the pilot flame mixture, or that the flow of mixtures of the pilot fuel and oxidizer to the combustion chamber can be selectively interrupted to establish the pulsed pilot flame.

DETAILED DESCRIPTION OF THE INVENTION

Figure 3:
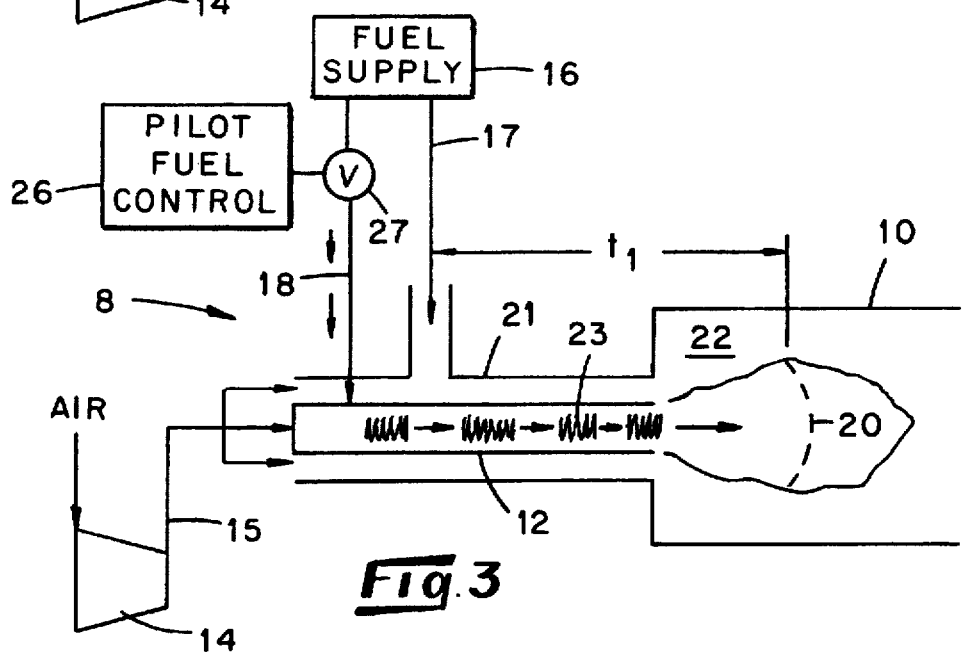
FIG. 3 is a schematic diagram of a combustion system similar to FIG. 1 but provided with means in accordance with the present invention for intermittently pulsing the pilot fuel into the pilot chamber for admixture with an introduced stream of oxidizer to produce a series of discrete combustible pilot mixtures which when introduced into the combustion chamber form intermittently existing pilot flame fronts which restructure and displace the main flame front and thereby provide a decoupling action between the pressure oscillations and the heat of combustion for reducing the amplitude of the pressure oscillations.

As briefly described above, it has been found that the oscillations frequently present in combustion chambers fired by liquid, gaseous, and solid hydrocarbon or other fuels in the presence of a suitable oxidizer are often of such high pressure and amplitude so as to deleteriously reduce the efficiency of the combustion system as well as significantly shorten the expected life of various components associated with the combustion chamber due to oscillation-induced vibrations and cyclic failures. Also, as pointed out above, the efforts to reduce environment-impacting emissions from hydrocarbon-fueled combustion chambers by the use of a stoichiometrically lean pre-mix is frequently responsible for the formation of the undesirable unsteady combustion-induced oscillations. For example, as illustrated in FIGS. 1 and 3, a conventional combustion system 8 incorporating a combustion chamber 10 of a suitable configuration and type such as used in a gas turbine application or in a steam-generating boiler is shown provided with a pilot chamber 12, an oxidizer supply at ambient pressure or at elevated pressures such as provided by a conventional compressor 14, and associated conduits or piping 15 for conveying the oxidizer from the oxidizer supply to the combustion chamber and the pilot chamber 12 as separate, appropriately portioned, streams. A fuel supply 16 including the necessary piping 17 and 18 is respectively provided for conveying separate streams of fuel from the fuel supply 16 to the combustion chamber 10 and to the pilot chamber 12. This fuel can be a hydrocarbon fuel or any other suitable fuel in any form such as gaseous, liquid, solid, or any suitable combination thereof. The oxidizer can be of any suitable combustion supporting medium for the particular fuel being used. For example, with a hydrocarbon fuel, the oxidizer can be readily provided by air, oxygen, oxygen-enriched air, or other oxygen containing gas or gases.

The separated stream of oxidizer from the oxidizer supply 14 and the stream of fuel in conduit or piping 17 from the fuel supply 16 used for producing the primary or main flame front in the combustion chamber 10 as generally shown at 20 are pre-mixed in a conventional pre-mixing chamber such as the annular chamber 21 generally shown coaxially disposed about the pilot chamber 12. This pre-mix of fuel and oxidizer is shown introduced into the combustion zone 22 at the upstream end region of the combustion chamber 10 where the fuel-oxidizer mixture is burned to produce the main flame front 20 for providing the heat energy to be used for desired work application. The hot products of combustion are discharged from the combustion chamber 10 through appropriate discharge means (not shown) that are located in the down stream region of the combustion chamber 10.

Figure 2:
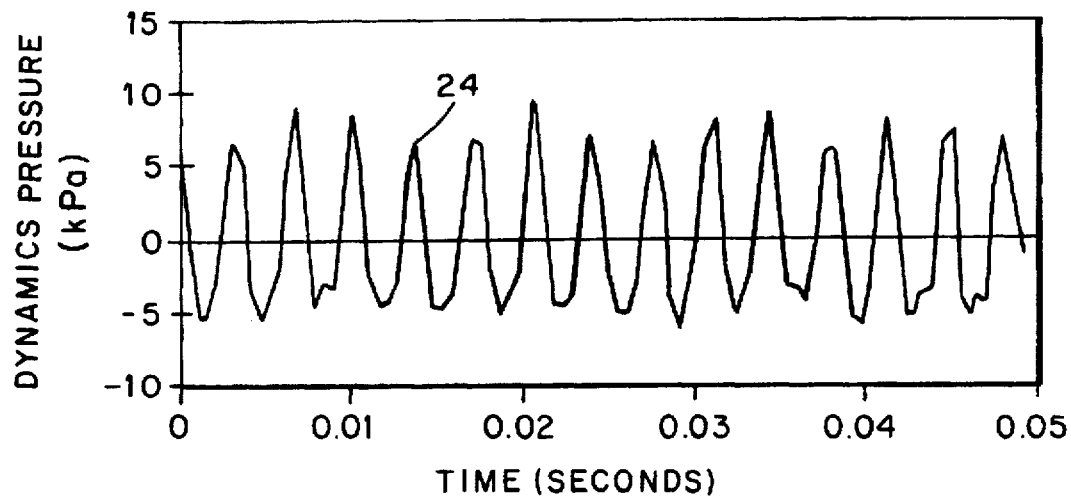
FIG. 2 is a graph illustrating the dynamic pressure oscillation occurring in a combustion chamber operating with unsteady combustion-induced oscillations as shown in FIG. 1.

In the operation of a combustion system provided with a pilot chamber 12 as in FIG. 1, the balance of the oxidizer and fuel from the oxidizer supply 14 and in the conduit or piping 18 from the fuel supply 16 are mixed in the pilot chamber 12, continually discharged therefrom into the combustion chamber 10, and initially fired by any suitable means such as a glow plug or a spark ignition device (not shown) to produce a steady state pilot flame 23 which extends downstream into the combustion zone 22 to establish and maintain the main flame front 20. Normally, and especially with lean pre-mixes, the combustion of the pre-mixed principal fuel-oxidizer mixture does not provide a steady state burn, but instead produces an unsteady burn forming intermittent pressure waves and periodic heat releases which cause the flame front 20 to oscillate back and forth in the combustion zone 22 as generally indicated by the double-ended arrows in the combustion zone 22. As pointed out above, it has been determined that when a pressure wave is in or essentially in an in-phase relationship with the heat release produced by the combustion of the oxidizer-fuel mixture, the oscillation pressure wave will be the strongest. In FIG. 2, the curve 24 illustrates an oscillating pressure wave occurring in a combustion chamber as in FIG. 1 undergoing unsteady combustion oscillation. The oscillation of the flame front 20 occurs when the transport time to is some fraction of the combustion acoustic period with the amplitude of the oscillation as shown by curve 24 increasing as the in-phase relationship of the pressure wave and the heat release approach one another.

Figure 4:
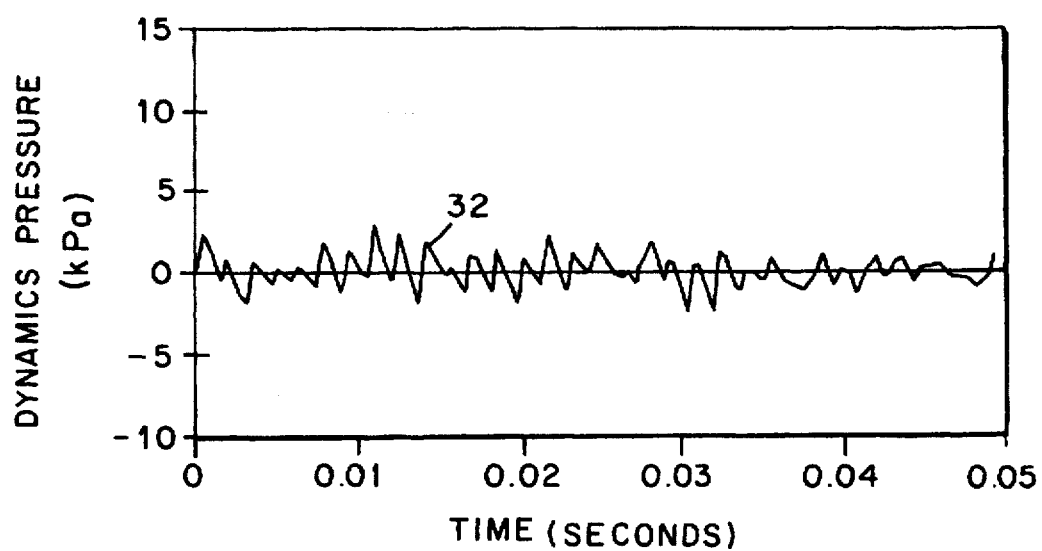
FIG. 4 is a graph illustrating the reduction of the high-amplitude pressure oscillations in the combustion system of FIG. 3 when provided with the combustor oscillating pressure stabilization mechanism of the present invention.

In accordance with the present invention the stabilization of the oscillations in the combustion zone 22 of the combustion chamber 10 is achieved by restructuring or moving the main flame front 20 to increase the transport time $t_1$ and thereby decouple the pressure and heat release parameters. When this in-phase relationship is changed or altered i.e., decoupled, the oscillation amplitude is reduced with the reduction and oscillating amplitude being greater with increasing separation of the in-phase relationship of the pressure wave to the periodic heat release. As shown in FIGS. 3 and 4, the combustion system 8 of FIG. 1 is modified by using a pilot fuel control system 26 for the intermittent or pulsing delivery of the pilot fuel from the fuel supply 16 to the pilot chamber 12. The control system 26 generally utilizes a quick acting on/off valve 27 in the pilot fuel conduit 18 with this valve 27 being operated by a suitable on-off control for pulsing the injection or delivery of the pilot fuel into the pilot chamber 12. This periodic injection or interruption of the injection of the pilot fuel into the pilot oxidizer stream for mixture therewith forms discrete charges or pulses of the mixture such as shown at 23 which are sequentially discharged from the pilot chamber into the combustion zone 22. Each injection of each pilot fuel-oxidizer charge serves to vary the equivalence ratio for chemical fuel concentration in the combustion zone 22 which restructures and moves the flame front 20 further away or downstream from the pilot chamber end of the combustion chamber 10 and produces a larger transport time $t_1$ as shown in FIG. 3. The extent of the flame restructuring and repositioning is directly dependent upon the combination of the frequency of injection of the discrete pilot fuel-oxidizer charges, the duration of each injection, and the equivalence ratio of the pilot fuel-oxidizer mixture.

The pilot fuel is delivered at a frequency independent of and considerably less than the frequency of the main-flame oscillations occurring in the combustion zone 22. In the present invention, with the main flame oscillating in the range of about 20-5000 Hz, the pilot fuel is pulsed or intermittently delivered to the pilot chamber 12 at an established frequency corresponding to less than about one-half the flame oscillating frequency and at a frequency in the range of about 1 Hz to about 2500 Hz. Preferably, in a combustion system fired with a hydrocarbon fuel in the presence of air where combustion pressure oscillations may occur in the combustion chamber at a frequency in the range of about 150-1200 Hz, the pulsing of the pilot fuel (or oxidizer) at a control frequency in the range of about 10-50 Hz, preferably 10-20, adequately restructures and repositions the main flame for effectively reducing the amplitude and frequency of combustion oscillations to a satisfactory level such as shown by the curve 32 in FIG. 4. The magnitude of the flame oscillation shown in FIG. 4 as provided by the practice of the present invention are insufficient to produce undesirable operating problems associated with the structural damage of the combustion system components and/or the lowering of the combustion efficiency of the system. It is similarly expected that the pulsation of the oxidizer for the pilot fuel, separate streams of the pilot fuel and the oxidizer, or a premix of the pilot fuel and oxidizer, at a frequency in the range of about 1 Hz to about 2500 Hz will satisfactorily reduce the pressure amplitude of the oscillations in a combustion chamber experiencing unsteady combustion-induced pressure oscillations at frequencies in the range of about 20-5000 Hz.

The fuel to oxidizer ratio in the main fuel-oxidizer mixture introduced into the combustion chamber can in the range of less than to greater than stoichiometric (a fuel to oxidizer equivalence ratio of less than one to greater than one). The fuel to oxidizer equivalence ratio in the mixture thereof used for establishing the discrete pilot flame pulses can also be in the range of less than one to greater than one to satisfactorily practice the present invention. However, since the secondary thermal energy in each pilot flame as produced by the combustion of each discrete charge or mixture of the pilot fuel and oxidizer is directly dependent upon the volume of fuel in each of these charges, the equivalence ratio of the fuel to the oxidizer in the pilot flame charges is preferably greater than one in order to assure that sufficient secondary thermal energy is present to effect the desired restructuring of the oscillating flame while maintaining an adequate timed spacing between the introduction of the discrete charges of the pilot fuel and oxidizer into the combustion chamber.

In accordance with the present invention about 2 to 20 percent of the total fuel introduced into the combustion chamber 10 is periodically injected into the pilot chamber 12 with the duration of each injection being sufficient to establish the series of spaced apart fuel-rich pilot flame fronts such as shown at 23 in FIG. 3 which together effect the restructuring of the oscillating main flame front 20 and the stabilization of the oscillating pressure in the combustion chamber 10. For example, in a typical combustion system wherein the primary fuel is a lean pre-mix or equivalence ratio with the ratio of fuel to oxidizer at a fraction, say 0.75, of the ratio required for stoichiometric burning, the pilot fuel can be injected at an equivalence ratio of about 2.24 to provide fuel-rich pilot flame fronts while still maintaining an overall or combined fuel-oxidizer ratio as a lean pre-mix with an equivalence ratio of about 0.83.

The duration of each pulses of the pilot flame and the equivalence ratio of the pilot fuel-oxidizer mixtures have a direct bearing on the restructuring of the main flame front 20 and is of considerable importance to the present invention in that each pulse of the pilot fuel and oxidizer mixture into the combustion chamber means must be of a sufficient duration to assure that the discrete pilot flames provide adequate thermal energy to interact with and effectively restructure the oscillating flame in the combustion zone for repositioning the oscillating flame. With the pilot flame front being pulsed at a rate in the range of about 1-2500 Hz, preferably 10-50 Hz when used for control of combustion oscillations in the range of about 150-1200 Hz, using pilot fuel-oxidizer charges with equivalence ratios in the range of about 0.5 to 2.5, preferably in the range of about 0.6 to 2.0, and with each pulse of the pilot fuel injection timed to last for a duration of about 0.1 ms to a time corresponding to about one-half the control frequency period, preferably in the range of about 1.0 ms to about 20 ms, the discrete pilot flame pulses each exist for a duration sufficient to restructure and move the main flame front 20 for effectively decoupling the heat pulses from the pressure waves. With the aforementioned range of control frequencies, the duration of the injection of the pilot fuel increasing from the lower end region of the above range with the equivalence ratio of the pilot fuel-oxidizer mixture decreasing from the upper end region of the above range.

Figure 5:
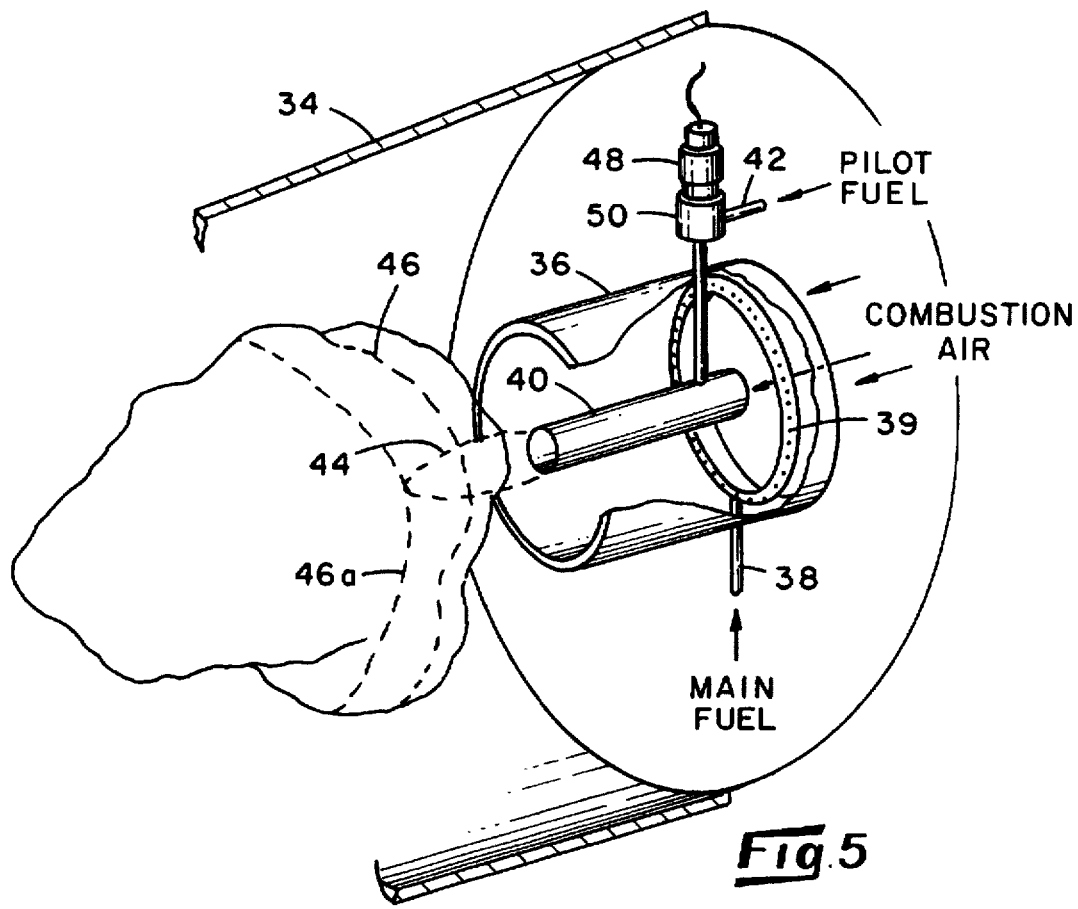
FIG. 5 is a detailed view of one embodiment of the present invention wherein a combustion chamber is provided with a pilot fuel-oxidizer mixing chamber with a control over the fuel supplied to the pilot chamber for effecting the intermittent introduction thereof into the pilot chamber so as to produce a pulsating pilot flame in the combustion amber for restructuring the oscillating flame front within the combustion chamber and thereby reducing the amplitude of the combustion oscillations.

With reference to FIG. 5, the present invention is shown in combination with a combustion chamber 34 provided with a coaxially mounted pre-mix chamber 36 for mixing the combustion oxidizer supplied at atmospheric pressure or at an elevated pressure from any suitable source such as a compressor (not shown) with the main fuel delivered into the mixing chamber 36 through line 38 and spray ring 39. The combustion chamber 34 is also provided with a pilot chamber 40 shown concentrically positioned in the mixing chamber 36 and communicating with one end region of the combustion chamber 34 as in conventional combustion systems employing pilot chambers. The exhaust gases resulting from the combustion of the fuel-oxidizer mixtures are normally discharged from the combustion chamber through an opening at an end region thereof opposite the fuel-oxidizer mixing chamber 36. Pilot fuel, which is usually conveyed in an amount of about 2 to 20 percent of the total fuel in a conventional lean mix operation, is introduced through line 42 and pre-mixed with a portion of the combustion oxidizer to establish a pilot flame generally shown at 44. If this pilot fuel is delivered into the pilot chamber 40 as a continuous or non-interrupted stream as in a conventional system or even pulse delivered at frequencies greater than about one-half the frequency of the main flame combustion oscillations, the combustion of the main fuel and oxidizer mixture together with the pilot flame mixture will be expected to form an unsteady oscillating flame front such as described above in FIGS. 1 and 2 with the amplitude and pressure of the oscillations being substantially greater than obtainable when using a lower control frequency and dependent upon the expected in-phase relationship of the pressure wave with the heat release produced by the combustion of both of the pilot fuel mixture and the main fuel mixture.

The selective interruption or pulsing of the injection or introduction of the pilot fuel into the pilot chamber at the selected control frequency and duration is achieved by employing a suitable fuel flow control device to effectively move the main flame front 46 further downstream from the pre-mix chamber 36 to a new position as shown at 46a that is out of the region where the acoustic coupling occurs. This control over the periodic delivery or injection of the pilot fuel is shown being provided by an electronic solenoid such as generally shown at 48 coupled to a fuel injector or valve 50 in fuel line 42. Any suitable on-off valve such as a rotary, ball, or any type valve capable of rapid on/off operation is satisfactory for use in the present invention. Also, if desired a fluidics device may be used to pulse the fuel into the pilot chamber.

The primary principal associated with the successful control of the combustion instability is the periodic variation of the equivalence ratio of the pilot fuel and oxidizer mixture. In some applications a certain level of oscillation within the combustion chamber may be tolerated or even desirable. Thus, the present invention can be utilized to reduce and maintain the oscillations at a desired level in a controlled manner.

Figure 6:
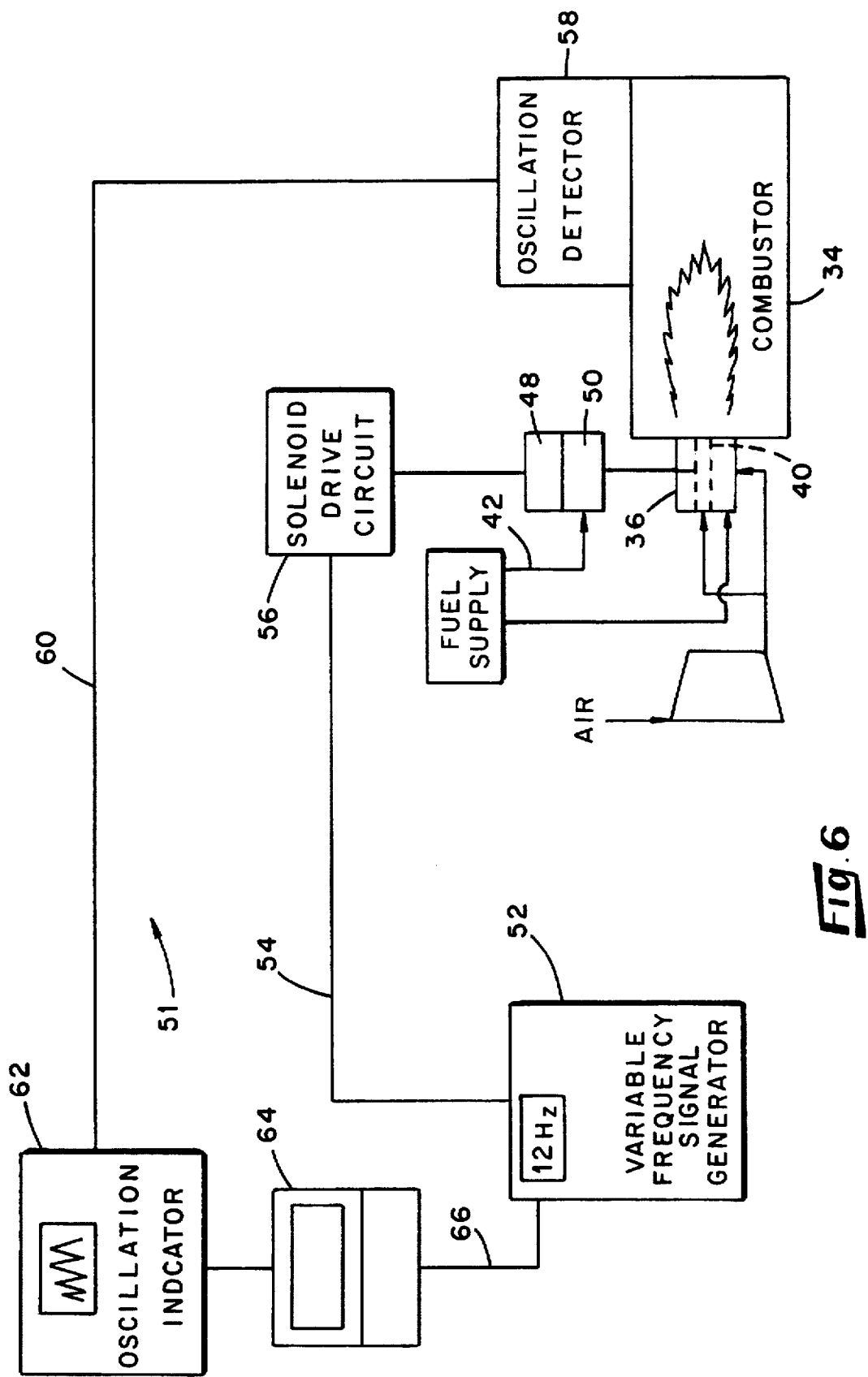
FIG. 6 is a schematic diagram of a combustion system provided with an open loop control arrangement for pulsing the fuel to the pilot chamber for selected durations for reducing the amplitude pressure oscillations in accordance with the present invention.

With reference to FIG. 6, the control over the periodic operation of the pilot fuel flow control device and the duration of the periodic operation of the pilot fuel injection may be readily provided by employing an open loop control system as shown at 51 in combination with the combustion chamber 34 of FIG. 5. The open loop control system 51 is shown comprising the solenoid 48 and injector 50 on the pilot fuel line 42. Operating signals generated at a frequency and for a duration in the required ranges described above can be provided in any suitable manner such as by using a conventional variable frequency signal generator shown at 52. These signals are shown conveyed via line 54 to a solenoid control or drive circuit 56 used to effect the periodic operation of the solenoid 48 and the associated fuel injector 50. The operation of the signal generator 52 for pulsing the pilot fuel at the desired frequency and duration can be achieved manually by a human operator upon noting the presence of the high pressure oscillations in the combustion chamber through a suitable readout or by using a simple oscillation detector 58 such as a pressure responsive diaphragm coupled to the combustion chamber 34 and connected by line 60, which may include suitable amplifiers, if needed, to an oscillation indicator 62 such as a conventional oscilloscope. The operator may use the readout from the oscillation indicator 62 for manually controlling the operation of the variable frequency signal generator 52. Alternatively, and preferably, the control of the frequency of the pilot fuel pulse can be automatically achieved by using the signal from the oscillating indicator 62 in a computer generally shown at 64 for providing through line 66 a logarithm for activating the signal generator 52 at the desired frequency and duration for the injection of the pilot fuel at a programmed level.

Figure 7:
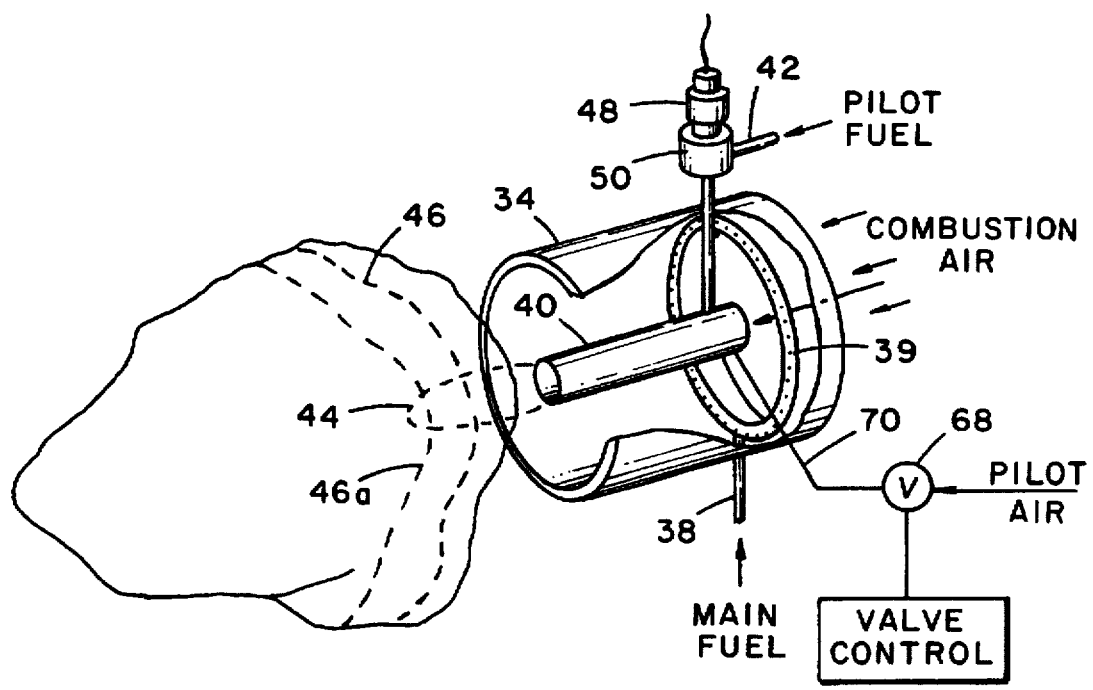
FIG. 7 is a schematic view of a further embodiment of the present invention wherein the oxidizer rather than the fuel supplied to the pilot chamber as in the FIG. 5 embodiment is intermittently interrupted or initiated to pulse the pilot flame for displacing the oscillating flame front and thereby effecting the reduction in the pressure amplitude of the oscillations.

A further embodiment of the present invention is shown in FIG. 7. In this embodiment the selective periodic interruption and formation of the pilot flame pulses 44 is provided by pulsing the flow of the pilot oxidizer rather than the pilot fuel. In this embodiment a simple on/off valve 68 is shown in the pilot oxidizer delivery line 70 to provide through the use of a control valve which functions similarly to the pilot fuel control 26 in FIG. 3, the pulsed pilot flame fronts at the frequency and duration sufficient to achieve essentially the same reduction in the amplitude of the flame front oscillations in the combustion chamber 34 as achieved by pulsing the pilot fuel. Also, in this embodiment the pilot fuel can be periodically interrupted along with the pilot oxidizer or continually delivered to the pilot chamber to provide the desired equivalence ratio of the oxidizer and fuel in the pilot chamber.

It is to be understood that a successful embodiment of the invention can also be practiced by using an auxiliary fuel and oxidizer delivery tube that delivers pulsating charges of the fuel and/or the oxidizer, or premixes thereof directly into to the upstream end region of the combustion chamber so as to produce a pulsating pilot flame without the use of a pilot chamber. Generally, it is simply a matter of convenience that the preferred embodiments of the present invention include the use of a pilot chamber whereby the pulsed pilot fuel or oxidizer can be delivered as in conventional combustion systems. Thus, while the description above has been directed to combustion systems in which the pilot chamber is used in conjunction with the combustion chamber, the principle of the present invention can be utilized with combustion chambers not fitted with a pilot chamber simply by diverting a portion of the fuel and oxidizer and pulsing flame fronts produced by the combustion of this 'pilot' fuel and oxidizer mixture into the upstream region of the combustion chamber where the pulsating pilot flame fronts would normally be present. Also, it is expected that essentially all combustion systems as presently used can be readily adapted to incorporate the combustion oscillating control of the present invention. It will be seen that the combustor oscillating pressure stabilizer and method of the present invention provides for the effective and inexpensive active control capable of reducing dynamic pressure oscillations in combustion systems to an acceptable level and that essentially all of the equipment utilized in the operation and practice of the present invention can be mounted sufficiently far away from the high temperature combustion chamber so as to avoid heat damage thereto or the use of expensive high-temperature equipment.

What is claimed is:

1. Improved apparatus for the active control of unstable oscillation-producing combustion in a combustion system comprising a combustion chamber having a combustion zone with opposite end regions and means for introducing a first mixture of a fuel and oxidizer into the combustion zone at one end region thereof for the combustion of the fuel and oxidizer mixture, wherein the combustion of the fuel and oxidizer mixture forms an oscillating flame within the combustion zone at a location intermediate said end regions to effect the formation of dynamic pressure oscillations within the combustion chamber with the amplitude of said oscillations being dependent upon the degree of an in-phase relationship of the pressure wave produced by each oscillation with the periodic heat release produced by the combustion of the fuel in said fuel and oxidizer mixture, the improved apparatus defined by combustion oscillating pressure stabilizing means for reducing the amplitude of the pressure oscillations within the combustion chamber and comprising, chamber means communicating with said combustion chamber at said one end region thereof, fuel supplying means and oxidizer supplying means coupled to one of said chamber means and said combustion chamber for introducing thereinto at least one flowing stream of fuel and oxidizer for forming a second mixture thereof for producing a pilot flame within said combustion zone at said one end region thereof, and flow control means for intermittently interrupting the flow of at least one of the fuel from the fuel supplying means and the oxidizer from the oxidizer supplying means into the chamber means at a selected frequency and duration for intermittently and sequentially interrupting and establishing the flow of said at least one of the fuel from the fuel supplying means and the oxidizer from the oxidizer supplying means into said one of the chamber means and the combustion chamber for forming discrete mixtures of fuel and oxidizer from said second mixture which sequentially produce a pulsing pilot flame within said combustion zone for contact with the oscillating flame in the combustion zone, said control means providing a frequency and duration of interrupting and establishing the flow of said at least one of the fuel and the oxidizer adequate to provide the pulsing pilot flame with sufficient thermal energy within said combustion zone to effect the restructuring of the oscillating flame and thereby sufficiently repositioning the oscillating flame in the combustion zone to change the phase relationship of each pressure wave with the each periodic heat release away from an in-phase relationship therebetween for reducing the amplitude of the pressure oscillations.

2. In an improved combustion system as claimed in claim 1, wherein the pressure oscillations are at a frequency in the range of about 20 to 5000 Hz, and wherein the intermittent interruption of the flow of said at least one of the fuel from the fuel supplying means and the oxidizer from the oxidizer supplying means is provided at a frequency less than about one-half of the frequency of the pressure oscillations and in the range of about 1 to about 2500 Hz.

3. In an improved combustion system as claimed in claim 2, wherein the the flow of at least one of the fuel and oxidizer is introduced into said one of the chamber means and the combustion chamber for a duration in the range of about 0.1 millisecond to a time corresponding to one-half of the period of said selected frequency.

4. In an improved combustion system as claimed in claim 1, wherein the pressure oscillations are at a frequency in the range of about 150 to 1200 Hz, and wherein the intermittent interruption of the flow of said at least one of the fuel from the fuel supplying means and the oxidizer from the oxidizer supplying means is provided at a frequency in the range of about 10 to 50 Hz.

5. In an improved combustion system as claimed in claim 4, wherein the the flow of at least one of the fuel and oxidizer is introduced into said one of the chamber means and the combustion chamber for a duration in the range of about 1.0 to 20 milliseconds.

6. In an improved combustion system as claimed in claim 1, wherein the ratio of the fuel to the oxidizer in said first mixture corresponds to a fuel equivalence ratio in the range of less than one to greater than about one, and wherein the ratio of the fuel to the oxidizer ratio in each of said discrete mixtures corresponds to a fuel equivalence ratio in the range of less than one to greater than one for providing fuel-lean to fuel-rich pulses of the pilot flame, and wherein the duration of the introduction of said at least one stream increases as the fuel equivalence ratio in said discrete mixtures decreases in said range of less than one to greater than one.

7. In an improved combustion system as claimed in claim 1, wherein said at least one stream comprises separate streams of fuel and oxidizer or a combined stream of fuel and oxidizer, and wherein means are provided for introducing said at least one stream formed of the oxidizer from the oxidizer supplying means and the fuel from the fuel supplying means into said one of the chamber means and the combustion chamber along a path separate from said first mixture.

8. In an improved combustion system as claimed in claim 7, wherein the fuel supplying means comprises first conduit means coupled to said chamber means, wherein the oxidizer supplying means comprises second conduit means coupled to said chamber means, and wherein said flow control means comprises valve means in at least one of said first and said second conduit means and valve control means for moving said valve means between open and closed positions at a frequency and duration sufficient to intermittently establish the flow of said least one stream of fuel and the oxidizer for pulsing the pilot flame in said combustion zone at the selected frequency and duration adequate to effect said restructuring and repositioning of the oscillating flame in the combustion chamber.

9. In an improved combustion system as claimed in claim 8, wherein said valve control means includes selectively adjustable means for controlling and varying the frequency and duration at which the pilot flame is pulsed.

10. In an improved combustion system as claimed in claim 9, where the ratio of the fuel to the oxidizer in said first mixture corresponds to a fuel equivalence ratio in the range of less than one to greater than about one and provides for the generation of the pressure oscillations in the combustion zone at a frequency in the range of about 150 to 1200 Hz, wherein the ratio of the fuel to the oxidizer ratio in each of said discrete mixtures corresponds to a fuel equivalence ratio in the range of less than one to greater than one for providing fuel-lean to fuel-rich pulses of the pilot flame, wherein said valve means are in said first conduit means, and wherein the selectively adjustable means intermittently interrupt the flow of the fuel from the fuel supplying means to the chamber means to pulse the pilot flame at a frequency less than about one-half of the frequency of the pressure oscillations and in the range of about 1 to about 2500 Hz and for a duration in the range of about 0.1 millisecond to a time corresponding to one-half of the period of said selected frequency.

11. In an improved combustion system as claimed in claim 10, wherein said valve means comprises fuel injector means, wherein the valve control means includes means responsive to an electrical signal for operating the fuel injector means, and wherein the selectively adjustable means comprises signal generating means for producing a series of discrete electrical signals for operating the fuel injector means at the selected frequency and duration.

12. In an improved combustion system as claimed in claim 9, where the ratio of the fuel to the oxidizer in said first mixture corresponds to a fuel equivalence ratio in the range of less than one to greater than about one and provides for the generation of the pressure oscillations in the combustion zone at a frequency in the range of about 150 to 1200 Hz, wherein the ratio of the fuel to the oxidizer ratio in each of said discrete mixtures corresponds to a fuel equivalence ratio in the range of less than one to greater than one for providing fuel-lean to fuel-rich pulses of the pilot flame, wherein said valve means are in said second conduit means, and wherein the selectively adjustable means intermittently interrupt the flow of the oxidizer from the oxidizer supplying means to the chamber means to pulse the pilot flame at a frequency at a frequency less than about one-half of the frequency of the pressure oscillations and in the range of about 1 to about 2500 Hz and for a duration in the range of about 0.1 millisecond to a time corresponding to one-half of the period of said selected frequency.

13. In the operation of a combustion system comprising a combustion chamber having a combustion zone with opposite end regions and fuel and oxidizer delivery means for forming and introducing a first mixture of fuel and oxidizer into the combustion zone at one end region thereof for the combustion of the first mixture of the fuel and oxidizer whereby the combustion of the first mixture produces an oscillating flame within the combustion zone at locations intermediate said end regions to effect the formation of dynamic pressure oscillations within the combustion chamber at a frequency in the range of about 20 Hz to about 5000 Hz, wherein the amplitude of each of the oscillations being dependent upon the degree of in-phase relationship of the pressure wave produced by each oscillation with the periodic heat release produced by the combustion of the first fuel and oxidizer mixture, the method for reducing the amplitude of the oscillations within the combustion chamber by the steps comprising: forming a second mixture of fuel and oxidizer from separate flows of fuel and oxidizer, introducing the second mixture into said combustion zone at a location adjacent to said one end region thereof for producing a pilot flame within said combustion zone at said one end region thereof; and, intermittently interrupting the flow of at least one of the fuel and the oxidizer forming said second mixture or the flow of the second mixture to produce discrete charges of the second mixture for intermittently interrupting and establishing the pilot flame within the combustion zone at a rate and for a duration adequate to produce sufficient thermal energy within said combustion zone for sufficiently restructuring the flame in the combustion zone and thereby repositioning the flame in the combustion zone with respect to said location for changing the phase relationship of each said pressure wave to each periodic heat release with respect to said in-phase relationship and thereby reducing the amplitude of the pressure oscillations in said combustion chamber.

14. In the operation of a combustion system as claimed in claim 13, wherein the rate of intermittently interrupting the flow of said at least one of the oxidizer and the fuel defining each of said discrete charges of the second mixture or the flow of the second mixture is at a selected frequency of less than about one-half of the frequency of the pressure oscillations and in the range of about 1 to 2500 Hz.

15. In the operation of a combustion system as claimed in claim 14, wherein the flow of at least one of the fuel and oxidizer defining each of said discrete charges of the second mixture or the flow of the second mixture is established between each interruption of said flow for a duration of about 0.1 milliseconds to a time corresponding to about one half of the period of said selected frequency.

16. In the operation of a combustion system as claimed in claim 13, wherein the ratio of the fuel to the oxidizer in said first mixture corresponds to a fuel equivalence ratio in the range of less than one to greater than about one, and wherein the ratio of the fuel to the oxidizer ratio in each charge of said second mixture corresponds to a fuel equivalence ratio in the range of less than one to greater than one for providing fuel-lean to fuel-rich pulses of the pilot flame, and wherein the duration of the flow of at least one of the fuel and oxidizer forming each charge of the second mixture or the flow of the second mixture increases as the fuel equivalence ratio in said second mixtures decreases in said range of less than one to greater than one.

17. In the operation of a combustion system as claimed in claim 13, wherein the step of intermittently interrupting the flow of at least one of fuel and the oxidizer and fuel to produce discrete charges of the second mixture is achieved by intermittently interrupting the flow of fuel forming the second mixture.

18. In the operation of a combustion system as claimed in claim 13, wherein the step of intermittently interrupting the flow of at least one of fuel and the oxidizer and fuel to produce discrete charges of the second mixture is achieved by intermittently interrupting the flow of oxidizer forming the second mixture.

19. In the operation of a combustion system as claimed in claim 13, wherein the step of intermittently interrupting the flow of at least one of fuel and the oxidizer and fuel to produce discrete charges of the second mixture is achieved by intermittently interrupting the flow of the fuel and the flow of the oxidizer forming the second mixture.

20. In the operation of a combustion system as claimed in claim 15, the additional step comprising generating a series of discrete electrical signals for selectively interrupting and establishing the flow of at least one of fuel and oxidizer forming each of discrete charges of the second mixture or the flow of the second mixture at said selected frequency and said duration.

21. In the operation of a combustion system as claimed in claim 15, wherein the pressure oscillations are at a frequency in the range of about 150–1200 Hz, and including the additional step comprising generating a series of discrete electrical signals for selectively interrupting and establishing the flow of at least one of fuel and oxidizer forming each of discrete charges of the second mixture or the flow of the second mixture at a frequency in the range of about 10 to 50

Hz and sufficient to interact with the frequency of the signals for adequately pulsing the pilot flame for effecting the restructuring and repositioning of the oscillating flame front away from said locations in the combustion zone where the pressure wave of each combustion oscillation is in or near an in-phase relationship with the heat release produced during each combustion oscillation.

22. In an improved combustion system as claimed in claim 13, wherein the fuel and oxidizer forming said second mixture is of a volume corresponding to about 2–20 percent of the volume of the fuel and oxidizer in said first mixture.

* * * * *